United States Patent
Choi et al.

(10) Patent No.: US 11,271,218 B2
(45) Date of Patent: Mar. 8, 2022

(54) CATHODE, LITHIUM AIR BATTERY INCLUDING CATHODE, AND METHOD OF PREPARING LITHIUM AIR BATTERY

(71) Applicant: Samsung Electronics Co., Ltd., Suwon-si (KR)

(72) Inventors: Wonsung Choi, Seoul (KR); Hyunjin Kim, Seoul (KR); Kyounghwan Choi, Suwon-si (KR); Mokwon Kim, Suwon-si (KR); Daiki Minami, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 111 days.

(21) Appl. No.: 16/734,571

(22) Filed: Jan. 6, 2020

(65) Prior Publication Data
US 2020/0220180 A1 Jul. 9, 2020

(30) Foreign Application Priority Data

Jan. 9, 2019 (KR) .................. 10-2019-0002985

(51) Int. Cl.
*H01M 4/90* (2006.01)
*H01M 4/86* (2006.01)
(Continued)

(52) U.S. Cl.
CPC ....... *H01M 4/9041* (2013.01); *H01M 4/8621* (2013.01); *H01M 12/02* (2013.01);
(Continued)

(58) Field of Classification Search
CPC ................. H01M 12/02; H01M 12/08; H01M 2004/028; H01M 2004/8689;
(Continued)

(56) References Cited

U.S. PATENT DOCUMENTS

| 9,954,231 B2 | 4/2018 | Kim et al. |
| 2015/0079485 A1 | 3/2015 | Choi et al. |

(Continued)

FOREIGN PATENT DOCUMENTS

| CN | 103515633 A | 1/2014 |
| CN | 107591567 A | 1/2018 |

(Continued)

OTHER PUBLICATIONS

Munekazu Motoyama, et al., "In Situ Scanning Electron Microscope Observations of Li Plating/Stripping Reactions with Pt Current Collectors on LiPON Electrolyte," Journal of the Electrochemical Society, May 4, 2018, vol. 165, Issue 7, pp. A1338-A1347.
(Continued)

*Primary Examiner* — Victoria H Lynch
(74) *Attorney, Agent, or Firm* — Cantor Colburn LLP

(57) ABSTRACT

The present invention relates to a cathode, a lithium air battery including a cathode, and a method of preparing the lithium air battery. A cathode configured to use oxygen as a cathode active material, the cathode including: a lithium alloy represented by Formula 1

$$Li_xM_y$$ Formula 1 wherein, in Formula 1, M is Pb, Sn, Mo, Hf, U, Nb, Th, Ta, Bi, Mg, Al, Si, Zn, Ag, Cd, In, Sb, Pt, or Au, $0<x\leq10$, $0<y\leq10$, and $0<x/y<10$.

21 Claims, 10 Drawing Sheets

(51) Int. Cl.
*H01M 12/02* (2006.01)
*H01M 12/08* (2006.01)

(52) U.S. Cl.
CPC .... *H01M 12/08* (2013.01); *H01M 2004/8689* (2013.01); *H01M 2300/0071* (2013.01)

(58) Field of Classification Search
CPC ....... H01M 2300/0071; H01M 4/0407; H01M 4/0461; H01M 4/134; H01M 4/1395; H01M 4/382; H01M 4/405; H01M 4/8621; H01M 4/9041; Y02E 60/10
See application file for complete search history.

(56) References Cited

U.S. PATENT DOCUMENTS

2016/0315329 A1 10/2016 Sankarasubramanian
2017/0133733 A1* 5/2017 Lee .................... H01M 4/885

FOREIGN PATENT DOCUMENTS

| JP | 4269917 B2 | 5/2009 |
| KR | 101454877 B1 | 11/2014 |
| KR | 1020150045673 A | 4/2015 |
| KR | 101602416 B1 | 3/2016 |
| KR | 101632793 B1 | 6/2016 |

OTHER PUBLICATIONS

European Search Report for European Patent Application No. 20150249.9 dated May 27, 2020.
Fangyi Cheng et al.: "Metal-air batteries: from oxygen reduction electrochimistry to cathode catalysts", Chemical Society Reviews,vol. 41, No. 06, Jan. 1, 2012, pp. 2172.
M. N. Obrovac et al.: "Alloy Negative Electrodes for Li-Ion Batteries", Chemical Reviews, vol. 114, No. 23, Dec. 10, 2014, pp. 11444-11502.
Martin Winter et al.: "Electrochimical Lithiation of tin and tin-based intermetallics and composites", Electrochimica Acta, vol. 45, No. 1-2, Sep. 1, 1999, pp. 31-50.
Yi-Chun Lu et al: "Platinum-Gold Nanoparticles: A Highly Active Bifunctional Elecrocatalyst for Rechargeble Lithium-Air Batteries", Journal of the American Chemical Society, vol. 132, No. 35, Sep. 8, 2010, pp. 12170-12171.

* cited by examiner

CATHODE, LITHIUM AIR BATTERY INCLUDING CATHODE, AND METHOD OF PREPARING LITHIUM AIR BATTERY

CROSS-REFERENCE TO RELATED APPLICATION

This application claims priority to and the benefit of Korean Patent Application No. 10-2019-0002985, filed on Jan. 9, 2019, in the Korean Intellectual Property Office, and all the benefits accruing therefrom under 35 U.S.C. § 119, the content of which is incorporated herein by reference in its entirety.

BACKGROUND

1. Field

The present disclosure relates to a cathode, a lithium air battery including the cathode, and a method of preparing the lithium air battery.

2. Description of the Related Art

A lithium air battery employs lithium as an anode active material and air as a cathode active material, and does not need to store air in the battery, thus enabling the battery to have a large capacity.

The theoretical specific energy of a lithium air battery may be about 3,500 Watt-hours per kilogram (Wh/kg) or greater. Such a specific energy of the lithium air battery is about 10 times greater than the theoretical specific energy of a lithium ion battery.

A cathode of a lithium air battery may be prepared by mixing a carbonaceous conductive agent, a binder, and the like. Upon charge/discharge of a lithium air battery, a radical may be generated during an electrochemical reaction, and consequently, a carbonaceous conductive agent, a binder, and the like may be easily decomposed. Therefore, a lithium air battery including such a cathode may easily deteriorate.

In addition, when a regular metal is used in a cathode of a lithium air battery, the discharge capacity may not be sufficient.

Therefore, there is a need for a cathode for a lithium air battery that is chemically stable against radicals generated during an electrochemical reaction, and having excellent capacity characteristics.

SUMMARY

Provided is a cathode having excellent electronic and ionic conductivity and excellent capacity characteristics.

Provided is a lithium air battery including the cathode.

Provided is a method of preparing a lithium air battery.

Additional aspects will be set forth in part in the description which follows and, in part, will be apparent from the description, or may be learned by practice of the presented embodiments.

According to an aspect of an embodiment, disclosed is a cathode configured to use oxygen as a cathode active material, the cathode including: a lithium alloy represented by Formula 1

$$Li_xM_y$$ Formula 1 wherein, in Formula 1, M is Pb, Sn, Mo, Hf, U, Nb, Th, Ta, Bi, Mg, Al, Si, Zn, Ag, Cd, In, Sb, Pt, or Au, 0<x≤10, 0<y≤10, and 0<x/y<10.

According to an aspect, a lithium air battery includes the cathode; an anode including lithium; and an electrolyte between the cathode and the anode.

According to an aspect, a method of preparing a lithium air battery include: disposing an electrolyte film on an anode including lithium; disposing a metal alloyable with lithium on the electrolyte film; and electrochemically forming a lithium alloy from the metal alloyable with lithium to form a cathode on the electrolyte film to prepare the lithium air battery, wherein the cathode is the cathode as described above.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
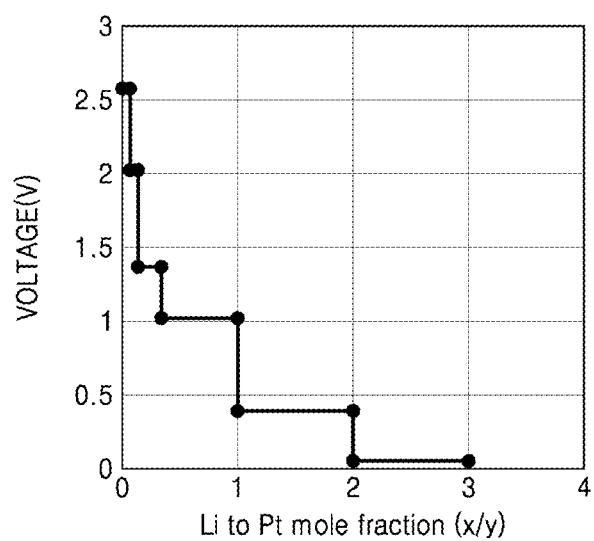
FIG. 1 is a graph of voltage (Volts, V) versus lithium (x) to platinum (y) ratio in a lithium metal alloy (x/y), illustrating the potential varied according to the change of the lithium to platinum mole fraction (x/y)

Reference will now be made in detail to embodiments, examples of which are illustrated in the accompanying drawings. In this regard, the embodiments may have different forms and should not be construed as being limited to the descriptions set forth herein. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terms used in the present specification are merely used to describe particular embodiment and are not intended to be limiting. As used herein, "a," "an," "the," and "at least one" are do not denote a limitation of quantity, and are intended to cover both the singular and plural, unless the context clearly indicates otherwise. For example, "an element" has the same meaning as "at least one element," unless the context clearly indicates otherwise. "Or" means "and/or." As used herein, the term "and/or" includes any and all combinations of one or more of the associated listed items. In the present specification, it is to be understood that the terms such as "comprises" and/or "comprising", are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. As used herein, "/" may be construed, depending on the context, as referring to "and" or "or".

In the drawings, the thicknesses of layers and regions are exaggerated or reduced for clarity. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a cathode and a lithium air battery including the cathode according to example embodiments will be described in further detail.

A cathode according to an aspect may be configured to use oxygen as a cathode active material and include a lithium alloy.

The lithium alloy included in the cathode may be structurally and chemically stable. The cathode including the lithium alloy, compared with a cathode including a carbonaceous conductive agent, may be prevented from decomposing when exposed to radicals and the like generated during electrochemical reactions. Thus, a lithium air battery including the cathode may have improved charge/discharge characteristics. The lithium alloy is an alloy of lithium and at least one metal other than lithium.

The lithium alloy may be an electronic conductor and a lithium ion conductor. While not wanting to be bound by theory, it is understood that the lithium alloy has a crystalline structure due to the inclusion of lithium, and thus the lithium alloy may provide a migration pathway for lithium ions. Also, the lithium alloy including lithium and at least one metal other than lithium, may have excellent electronic conductivity and ionic conductivity. Accordingly, the lithium alloy may be a lithium ion conductor as well as an electronic conductor. Further, since the lithium alloy may serve as a lithium ion conductor, a separate electrolyte may be omitted if desired. In an aspect, the cathode does not include a separate electrolyte.

According to an embodiment, the lithium alloy may be represented by Formula 1:

$$Li_xM_y \qquad \text{Formula 1}$$

wherein, in Formula 1, M may be a metal alloyable with lithium, and $0<x\leq10$, $0<y\leq10$, and $0<x/y<10$.

In Formula 1, M may be any metal or semimetal alloyable with lithium and is not particularly limited. For example, M may be at least one metal element belonging to Groups 2 to 16 of the Periodic Table of Elements.

In an embodiment, in Formula 1, M may be at least one of Pb, Sn, Mo, Hf, U, Nb, Th, Ta, Bi, Mg, Al, Si, Zn, Ag, Cd, In, Sb, Pt, or Au. In an embodiment, in Formula 1, M may be at least one of Pt, Au, Ag, Sn, Zn, Mg, Al, Si, Sb, or Bi. In an embodiment, in Formula 1, M may be at least one of Pt, Au, or Ag.

In Formula 1, x and y may indicate a molar content of Li and M in Formula 1, respectively. When where x is greater than 10, the lithium alloy may have a low thermodynamic potential, which can be problematic. When y is greater than 10, a content of lithium may be low relative to a crystalline structure of the alloy as a whole, thus resulting in a low ionic conductivity.

For example, in Formula 1, $0<x\leq10$ or $0<x\leq5$ or $0<x\leq2$ or $0.05<x\leq10$ or $0.05<x\leq5$ or $0.05<x\leq2$ or $0.1<x\leq10$ or $0.1<x\leq5$ or $0.3<x\leq10$ or $0.3<x\leq5$ or $1\leq x\leq5$ or $1\leq x\leq2$; and in Formula 1, $0<y\leq10$ or $0<y\leq8$ or $1\leq y\leq10$ or $1\leq y\leq8$.

In an embodiment, in Formula 1, $0<x/y<9$. In an embodiment, in Formula 1, $0<x/y<5$. In an embodiment, in Formula 1, $0<x/y\leq2$. In an embodiment, in Formula 1, $0<x/y\leq1$. In an embodiment, in Formula 1, $0<x/y<0.5$. In an embodiment, in Formula 1, $0<x/y<0.2$.

FIG. 1 is a graph of voltage (Volts, V) versus a mole fraction of lithium (x) to platinum (y) (x/y), illustrating the potential varied according to the change of the lithium to platinum mole fraction (x/y). As shown in FIG. 1, the potential varied according to the change of the lithium to platinum mole fraction (x/y), which is a mole fraction of lithium to M. In detail, when x is greater than y, the potential was found to be deteriorated. In particular, when the lithium to platinum mole fraction (x/y) is greater than 2, the potential may converge toward 0.

The lithium alloy may be at least one of $Li_{0.06}Pt$, $Li_{0.14}Pt$, $Li_{0.33}Pt$, $LiPt$, $Li_2Pt$, $LiPt_7$, $Li_{0.06}Au$, $Li_{0.14}Au$, $Li_{0.33}Au$, $LiAu$, $Li_2Au$, $LiAu_7$, $Li_{0.06}Ag$, $Li_{0.14}Ag$, $Li_{0.33}Ag$, $LiAg$, $Li_2Ag$, or $LiAg_7$, but the disclosed embodiment is not limited thereto.

In an embodiment, an electronic conductivity of the lithium alloy may be $1.0\times10^{-3}$ Siemens per centimeter (S/cm) or greater.

An electronic conductivity of the lithium alloy may be, for example, $2.0\times10^{-3}$ S/cm or greater, $4.0\times10^{-3}$ S/cm or greater, $5.0\times10^{-3}$ S/cm or greater, $1.0\times10^{-2}$ S/cm or greater, $2.0\times10^{-2}$ S/cm or greater, $4.0\times10^{-2}$ S/cm or greater, $5.0\times10^{-2}$ S/cm or greater, $1.0\times10^{-1}$ S/cm or greater, or $2.0\times10^{-1}$ S/cm or greater. Due to such a high electronic conductivity of the lithium alloy, internal resistance of the cathode and the lithium air battery including the lithium alloy may decrease.

An electronic conductivity of the lithium alloy may be, for example, in a range of about $1.0\times10^{-3}$ S/cm to about $1.0\times10^8$ S/cm, about $2.0\times10^{-3}$ S/cm to about $1.0\times10^8$ S/cm, about $2.0\times10^{-3}$ S/cm to about $5.0\times10^7$ S/cm, about $4.0\times10^{-3}$ S/cm to about $5.0\times10^7$ S/cm, about $4.0\times10^{-3}$ S/cm to about $1.0\times10^7$ S/cm, about $5.0\times10^{-3}$ S/cm to about $1.0\times10^7$ S/cm, about $1.0\times10^{-2}$ S/cm to about $1.0\times10^7$ S/cm, about $2.0\times10^{-2}$ S/cm to about $1.0\times10^7$ S/cm, about $4.0\times10^{-2}$ S/cm to about $1.0\times10^7$ S/cm, about $5.0\times10^{-2}$ S/cm to about $1.0\times10^7$ S/cm, about $1.0\times10^{-1}$ S/cm to about $1.0\times10^7$ S/cm, about $2.0\times10^{-1}$ S/cm to about $5.0\times10^6$ S/cm, or about $2.0\times10^{-1}$ S/cm to about $1.0\times10^6$ S/cm.

An ionic conductivity of the lithium alloy may be, for example, about $2\times10^{-3}$ S/cm or greater, about $4\times10^{-3}$ S/cm or greater, about $5\times10^{-3}$ S/cm or greater, about $1\times10^{-2}$ S/cm or greater, about $2\times10^{-2}$ S/cm or greater, about $4\times10^{-2}$ S/cm or greater, about $5\times10^{-2}$ S/cm or greater, about $1\times10^{-1}$ S/cm or greater, or about $2\times10^{-1}$ S/cm or greater. Due to such a high ionic conductivity of the lithium alloy, internal resistance of the cathode and the lithium battery including the lithium alloy may further decrease.

An ionic conductivity of the lithium alloy may be, for example, in a range of about $1.0\times10^{-3}$ S/cm to about $1.0\times10^{-8}$ S/cm, about $2.0\times10^{-3}$ S/cm to about $1.0\times10^{-8}$ S/cm, about $2.0\times10^{-3}$ S/cm to about $5.0\times10^{-7}$ S/cm, about $4.0\times10^{-3}$ S/cm to about $5.0\times10^{-7}$ S/cm, about $4.0\times10^{-3}$ S/cm to about $1.0\times10^{-7}$ S/cm, about $5.0\times10^{-3}$ S/cm to about $1.0\times10^{-7}$ S/cm, about $1.0\times10^{-2}$ S/cm to about $1.0\times10^{-7}$ S/cm, about $2.0\times10^{-2}$ S/cm to about $1.0\times10^{-7}$ S/cm, about $4.0\times10^{-2}$ S/cm to about $1.0\times10^{-7}$ S/cm, about $5.0\times10^{-2}$ S/cm to about $1.0\times10^{-7}$ S/cm, about $1.0\times10^{-1}$ S/cm to about $1.0\times10^{-7}$ S/cm, about $2.0\times10^{-1}$ S/cm to about $1.0\times10^{-7}$ S/cm, about $2.0\times10^{-1}$ S/cm to about $5.0\times10^{-6}$ S/cm, or about $2.0\times10^{-1}$ S/cm to about $1.0\times10^{-6}$ S/cm.

The lithium alloy may be, for example, a mixed conductor having both lithium ionic conductivity and electron conductivity. The mixed conductor may have, for example, an electronic conductivity of $1.0\times10^{-3}$ S/cm or greater and an ionic conductivity of $1.0\times10^{-3}$ S/cm or greater. The mixed conductor may have, for example, an electronic conductivity of $1.0\times10^{-3}$ S/cm or greater and an ionic conductivity of $2.0\times10^{-3}$ S/cm or greater. As the lithium alloy may serve as a mixed conductor, thereby having both ionic conductivity and electronic conductivity, the cathode may omit use of an additional or a separate conductive agent and a separate electrolyte. In an embodiment, the cathode does not include an additional conductive agent or an additional electrolyte.

A discharge capacity of the lithium alloy may be about 1 microampere-hours per square centimeter ($\mu Ah/cm^2$) or greater.

A discharge capacity of the lithium alloy may be, for example, 5.0 $\mu Ah/cm^2$ or greater, $1.0\times10^1$ $\mu Ah/cm^2$ or greater, $2.0\times10^1$ $\mu Ah/cm^2$ or greater, $4.0\times10^1$ $\mu Ah/cm^2$ or greater, $5.0\times10^1$ $\mu Ah/cm^2$ or greater, $7.0\times10^1$ $\mu Ah/cm^2$ or greater, or $9.0\times10^1$ $\mu Ah/cm^2$ or greater. Due to such a high discharge capacity of the lithium alloy, capacity characteristics of the cathode and the lithium battery including the lithium alloy may further improve.

A discharge capacity of the lithium alloy may be, for example, in a range of about 5 $\mu Ah/cm^2$ to about $5\times10^3$ $\mu Ah/cm^2$, about $1\times10^1$ $\mu Ah/cm^2$ to about $5\times10^3$ $\mu Ah/cm^2$, about $2\times10^1$ $\mu Ah/cm^2$ to about $5\times10^3$ $\mu Ah/cm^2$, about $2\times10^1$ $\mu Ah/cm^2$ to about $4\times10^3$ $\mu Ah/cm^2$, about $4\times10^1$ $\mu Ah/cm^2$ to about $4\times10^3$ $\mu Ah/cm^2$, about $5\times10^1$ $\mu Ah/cm^2$ to about $4\times10^3$ $\mu Ah/cm^2$, about $7\times10^1$ $\mu Ah/cm^2$ to about $3\times10^3$ $\mu Ah/cm^2$, or about $9\times10^1$ $\mu Ah/cm^2$ to about $2\times10^3$ $\mu Ah/cm^2$.

In an embodiment, a discharge capacity of the lithium alloy relative to a weight of the cathode may be 100 milliampere-hours per gram of the cathode ($mAh/g_{cathode}$) or greater. Here, $g_{cathode}$ refers to a weight (gram) of a cathode, and $mAh/g_{cathode}$ refers to a unit of a discharge capacity per gram of the cathode.

A discharge capacity of the lithium alloy relative to a weight of the cathode may be, for example, 150 $mAh/g_{cathode}$ or greater, 200 $mAh/g_{cathode}$ or greater, 250 $mAh/g_{cathode}$ or greater, 300 $mAh/g_{cathode}$ or greater, 350 $mAh/g_{cathode}$ or greater, 400 $mAh/g_{cathode}$ or greater, or 450 $mAh/g_{cathode}$ or greater. When a discharge capacity of the lithium alloy relative to a weight of the cathode is within any of these ranges, capacity characteristics of the cathode and the lithium battery including the lithium alloy may further improve.

A discharge capacity of the lithium alloy relative to a weight of the cathode may be, for example, in a range of about 150 mAh/$g_{cathode}$ to about 200,000 mAh/$g_{cathode}$, about 200 mAh/$g_{cathode}$ to about 200,000 mAh/$g_{cathode}$, about 200 mAh/$g_{cathode}$ to about 150,000 mAh/$g_{cathode}$, about 250 mAh/$g_{cathode}$ to about 150,000 mAh/$g_{cathode}$, about 300 mAh/$g_{cathode}$ to about 150,000 mAh/$g_{cathode}$, about 350 mAh/$g_{cathode}$ to about 150,000 mAh/$g_{cathode}$, about 400 mAh/$g_{cathode}$ to about 150,000 mAh/$g_{cathode}$, or about 450 mAh/$g_{cathode}$ to about 100,000 mAh/$g_{cathode}$.

The lithium alloy may be a lithium ionic conductor and may be, for example, electrochemically stable at a voltage of 2.5 V or higher versus lithium metal.

The lithium alloy may be electrochemically stable, for example, at a voltage in a range of about 2.5 V to about 4.2 V versus lithium metal. In an aspect, the lithium alloy is not oxidized or reduced when in contact with lithium metal at a potential of about 2.5 V to about 4.2 V versus lithium metal.

The cathode may be, for example, porous. As the cathode is porous, diffusion of air or oxygen into the cathode may be facilitated.

The cathode may further include, for example, a metal alloyable with lithium which is a precursor of the lithium alloy. In an embodiment, the cathode may include the lithium alloy represented by Formula 1 and may further include a metal represented by M, wherein M is the same as defined in Formula 1.

According to another example embodiment, a lithium metal battery may include the cathode described above; an anode including lithium; and an electrolyte between the cathode and the anode.

As the lithium air battery includes the cathode including the lithium alloy, the lithium air battery may have improved structural stability, capacity characteristics, and lifespan characteristics.

Upon discharge of the lithium air battery, a discharge product may be formed on a surface of the cathode. That is, the discharge product may be formed on an interface between the cathode and oxygen, rather than a three-phase interface between the cathode, a solid electrolyte, and oxygen. The formation of the discharge product may result from the smooth migration of ions and electrons due to the cathode including the lithium alloy. Accordingly, in an embodiment, after discharge of the lithium air battery, the lithium air battery further comprises a discharge product disposed on a surface of the cathode.

For example, upon discharge of the lithium air battery, a discharge product formed on a surface of the cathode may include at least one of lithium peroxide, lithium oxide, lithium hydroxide, or lithium carbonate. Without being limited by theory, it is understood that the discharge product may be formed due to the electrochemical reaction between lithium ions transferred from a solid electrolyte membrane and oxygen used as a cathode active material.

In an embodiment, the discharge product may be at least one of $Li_2O_2$, LiOH, $Li_2CO_3$, or $Li_2O$, and may be $Li_2O_2$, LiOH, $Li_2CO_3$, or $Li_2O$, but the discharge product is not limited thereto.

A thickness of the discharge product may be, for example, 10 micrometers (μm) or less, or about 8 μm or less, or about 5 μm or less. When a thickness of the discharge product is greater than 10 μm, an energy density of the battery may decrease.

In an embodiment, a thickness of the discharge product may be in a range of about 1 nm to about 10 μm, or about 1 μm to about 8 μm, or about 1 μm to about 5 μm.

The lithium air battery may include a cathode. The cathode may be an air electrode. For example, the cathode may be disposed on a cathode current collector.

The cathode may include the lithium alloy described above. A content of the lithium alloy may be in a range of, for example, about 1 part by weight to about 100 parts by weight, about 10 parts by weight to about 100 parts by weight, about 50 parts by weight to about 100 parts by weight, about 60 parts by weight to about 100 parts by weight, about 70 parts by weight to about 100 parts by weight, about 80 parts by weight to about 100 parts by weight, or about 90 parts by weight to about 100 parts by weight, based on 100 parts by weight of the cathode. The cathode obtained by sintering and/or pressing lithium alloy powder may be substantially constituted of a lithium alloy. For example, the cathode may consist essentially of, or consist of the lithium alloy.

Upon manufacture of a cathode, a pore-forming agent may be added to thereby introduce pores in the cathode. The cathode may be, for example, porous. The cathode may be, for example, in a form of a porous pellet or a porous sheet, but the disclosed embodiment is not limited thereto. The cathode may have a porosity of about 5% to about 80%, or about 10% to about 75%, or about 20% to about 60%. As used herein the term "porosity" is used to refer to a measure of the empty space (e.g., voids or pores) in a material and is determined as a percentage of the volume of voids in a material based on the total volume of the material.

The size and shape of the cathode may be varied depending on the battery shape. As the cathode consists essentially of or consists of a lithium alloy, a structure and the manufacture of the cathode may be simplified. The cathode may be, for example, permeable to a gas such as oxygen or air. Accordingly, the cathode may be distinct from cathodes in the related art that are substantially non-permeable to gas such as oxygen or air and conduct ions only. As the cathode is porous and/or gas-permeable, oxygen or air may be easily diffused into the cathode, and lithium ions and/or electrons may easily migrate through the lithium alloy included in the cathode. Thus, electrochemical reactions between oxygen atoms, lithium ions and electrons may easily occur in the cathode.

In an embodiment, the cathode may further include, for example, a cathode material other than a lithium alloy.

The cathode may include, for example, a conductive material. Such a conductive material may be, for example, porous. As the conductive material is porous, permeation of air into the conductive material may be facilitated. The conductive material may be a material that is porous and/or electrically conductive. Any conductive material suitable for a cathode of a lithium air battery may be used. For example, the conductive material may be a porous carbonaceous material. Examples of the porous carbonaceous material may include at least one of carbon black, graphite, graphene, activated carbon, or carbon fiber. Any suitable carbonaceous material may be used. The conductive material may be, for example, a metallic material. The metallic material may be, for example, at least one of a metal fiber, a metal mesh, or a metal powder. The metal powder may be, for example, at least one of copper, silver, nickel, or aluminum. The conductive material may be, for example, an electrically conductive organic material. Examples of the electrically conductive organic material include a polyphenylene derivative or a polythiophene derivative. A combination comprising at least two of the foregoing conductive materials may also be used. The cathode may include the lithium alloy as the conductive material. The cathode may further include any of the above-listed conductive materials, in addition to the lithium alloy.

The cathode may further include, for example, a catalyst for oxidation/reduction of oxygen. The catalyst may be, for example, a precious metal-based catalyst such as platinum, gold, silver, palladium, ruthenium, rhodium, and osmium; an oxide-based catalyst such as manganese oxide, iron oxide, cobalt oxide, and nickel oxide; and an organometallic catalyst such as cobalt phthalocyanine. However, the disclosed embodiment is not limited thereto. Any suitable catalyst for oxidation/reduction of oxygen may be used.

For example, the catalyst may be supported on a catalyst support. The catalyst support may be, for example, an oxide catalyst support, a zeolite catalyst support, a clay-based mineral catalyst support, or a carbon catalyst support. The oxide catalyst support may be, for example, a metal or semimetal oxide catalyst support including at least one of Al, Si, Zr, Ti, Ce, Pr, Sm, Eu, Tb, Tm, Yb, Sb, Bi, V, Cr, Mn, Fe, Co, Ni, Cu, Nb, Mo, or W. The oxide catalyst support may include, for example, at least one of alumina, silica, zirconium oxide, or titanium dioxide. The carbon catalyst support may be carbon black such as Ketjen black, acetylene black, channel black, and lamp black; a graphite such as natural graphite, artificial graphite, and expandable graphite; activated carbon; and carbon fiber. However, the disclosed embodiment is not limited thereto. Any suitable catalyst support available in the art may be used. A combination comprising at least two of the foregoing catalyst supports may also be used.

For example, the cathode may further include a binder. The binder may include, for example, a thermoplastic resin or a thermocurable resin. Non-limiting examples of the binder include at least one of polyethylene, polypropylene, polytetrafluoroethylene (PTFE), polyvinylidene fluoride (PVdF), styrene-butadiene rubber, a tetrafluoroethylene-perfluoro (C1-C20)alkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoro propylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethyl vinyl ether-tetrafluoro ethylene copolymer, or ethylene-acrylic acid copolymer. Any suitable binder for a cathode may be used.

For example, the cathode may be manufactured by mixing a conductive material, a catalyst for oxidation/reduction of oxygen, and a binder together, adding a solvent to the resulting mixture to prepare a cathode slurry, coating the cathode slurry on a surface of a base, drying the coated cathode slurry, and press-molding the cathode slurry against the base to improve a density of the cathode. The base may be, for example, a cathode current collector, a separator, or a solid electrolyte film. The cathode current collector may be, for example, a gas diffusion layer. The conductive material may include the lithium alloy. The catalyst for oxidation/reduction of oxygen and the binder may be omitted depending on a type of the cathode.

The lithium air battery may include an anode. The anode may include lithium.

The anode may be, for example, a lithium metal thin film or a lithium metal alloy-based thin film. For example, the lithium metal alloy of the anode may be an alloy of lithium with, for example, at least one of aluminum, tin, magnesium, indium, calcium, titanium, or vanadium.

The lithium air battery may include an electrolyte between the cathode and the anode.

The electrolyte may include at least one of a liquid electrolyte, a gel electrolyte, or a solid electrolyte. The liquid electrolyte, the gel electrolyte, and the solid electrolyte are not particularly limited, and may be any suitable electrolyte for a lithium air battery.

In an embodiment, the electrolyte may include a solid electrolyte.

The solid electrolyte may include at least one of a solid electrolyte including an ion-conductive inorganic material, a solid electrolyte including a polymeric ionic liquid (PIL) and a lithium salt, a solid electrolyte including an ion-conductive polymer and a lithium salt, a solid electrolyte including an electron-conductive polymer. However, the disclosed embodiment is not limited thereto. Any suitable material available as a solid electrolyte may be used.

The ion-conductive inorganic material may include at least one of a glass or amorphous metal ionic conductor, a ceramic active metal ionic conductor, or a glass-ceramic active metal ionic conductor. However, the disclosed embodiment is not limited thereto. Any suitable ion-conductive inorganic material available in the art may be used. The ion-conductive inorganic material may be, for example, a molded product of ion-conductive inorganic particles or sheet.

For example, the ion-conductive inorganic material may be at least one of $BaTiO_3$, $Pb(Zr_aTi_{1-a})O_3$ wherein $0 \leq a \leq 1$ (PZT), $Pb_{1-x}La_xZr_{1-y}Ti_yO_3$ (PLZT) (where $0 \leq x' < 1$ and $0 \leq y' < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_{y'}(PO_4)_3$, where $0<x'<2$ and $0<y'<3$), lithium aluminum titanium phosphate ($Li_xAl_{y'}Ti_{z'}(PO_4)_3$, where $0<x'<2$, $0<y'<1$, and $0<z'<3$), $Li_{1+x+y}(Al_aGa_{1-a})_x(Ti_bGe_{1-b})_{2-x}Si_yP_{3-y}O_{12}$ (where $0 \leq x \leq 1$, $0 \leq a \leq 1$, and $0 \leq b \leq 1$), lithium lanthanum titanate ($Li_{x'}La_{y'}TiO_3$, where $0<x'<2$ and $0<y'<3$), lithium germanium thiophosphate ($Li_xGe_{y'}P_{z'}S_{w'}$, where $0<x'<4$, $0<y'<1$, $0<z'<1$, and $0<w'<5$), lithium nitride ($Li_xN_{y'}$, where $0<x'<4$ and $0<y'<2$), a $SiS_2$ glass ($Li_{x'}Si_{y'}S_{z'}$, where $0<x'<3$, $0<y'<2$, and $0<z'<4$), a $P_2S_5$ glass ($Li_{x'}P_{y'}S_{z'}$, where $0<x'<3$, $0<y'<3$, and $0<z'<7$), $Li_2O$, $LiF$, $LiOH$, $Li_2CO_3$, $LiAlO_2$, $Li_2O$—$Al_2O_3$—$SiO_2$—$P_2O_5$—$TiO_2$—$GeO_2$-based ceramic, or a garnet-based ceramic ($Li_{3+x}La_3M_2O_{12}$ (M=Te, Nb, or Zr), where $0 \leq x' \leq 1$).

In an embodiment, the solid electrolyte may be a lithium ion-conductive glass, a crystalline or polycrystalline lithium ion-conductive ceramic, or a crystalline or polycrystalline lithium ion-conductive glass-ceramic. In consideration of chemical stability, the solid electrolyte may include an oxide. In a case where the solid electrolyte includes relatively large amounts of a lithium ion-conductive crystal, a lithium alloy may have a high ionic conductivity. For example, a content of the lithium ion-conductive crystal may be about 50 percent by weight (wt %) or greater, about 55 wt % or greater, or about 60 wt % or greater, based on a total weight of the solid electrolyte. The lithium ion-conductive crystal may be, for example, $Li_3N$; a lithium superionic conductor (LISICON); a crystal having a perovskite structure, and which is lithium ion-conductive, such as $La_{0.55}Li_{0.35}TiO_3$; $LiTi_2P_3O_{12}$ having a Na superionic conductor (NASICON)-type structure; or a glass-ceramic that may precipitate these crystals. The lithium ion conductive crystal may be $Li_{1+x+y}(Al_aGa_{1-a})_x(Ti_bGe_{1-b})_{2-x}Si_yP_{3-y}O_{12}$ (where $0 \leq x \leq 1$, $0 \leq y \leq 1$, $0 \leq a \leq 1$, and $0 \leq b \leq 1$, for example, $0 \leq x \leq 0.4$ and $0 < y \leq 0.6$, or $0.1 \leq x \leq 0.3$ and $0.1 < y \leq 0.4$). For the lithium ion-conductive crystal to have a high ionic conductivity, the lithium ion-conductive crystal may not have a grain boundary that hinders ion conduction. For example, a glass-ceramic may not have a pore or a grain boundary that hinders ion conduction. Thus, a glass-ceramic may have a high ion conductivity and excellent chemical stability. Examples of a lithium ion conductive glass-ceramic include at least one of lithium-aluminum-germanium-phosphate (LAGP), lithium-aluminum-titanium-phosphate (LATP), or lithium-aluminum-titanium-silicon-phosphate (LATSP). For example, when a starting material glass has a composition of $Li_2O$—$Al_2O_3$—$TiO_2$—$SiO_2$—$P_2O_5$ and is heat-treated to facilitate crystallization, the major crystalline phase may be $Li_{1+x+y}Al_xTi_{2-x}Si_yP_{3-y}O_{12}$ (where $0 \le x \le 2$ and $0 \le y \le 3$). In an embodiment, x and y may be, for example, $0 \le x \le 0.4$ and $0 < y \le 0.6$, or $0.1 \le x \le 0.3$ and $0.1 < y \le 0.4$. A pore or a grain boundary that hinders ion conduction refers to a material having a pore or a grain boundary that lowers the total conductivity of an inorganic material including a lithium ion-conductive crystal to one tenth of a conductivity of an inorganic material including the lithium ion-conductive crystal but without a pore or a grain boundary.

In an embodiment, the solid electrolyte may include at least one of lithium-aluminum-germanium-phosphate (LAGP), lithium-aluminum-titanium-phosphate (LATP), or lithium-aluminum-titanium-silicon-phosphate (LATSP).

The polymeric ionic liquid (PIL) may include, for example, a repeating unit including at least one cation and at least one anion. The at least one cation may be one of an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation. The at least one anion may be at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2O)_2PO^-$. For example, the PIL may be at least one of poly(diallyldimethyl ammonium) (TFSI), poly(l-allyl-3-methyl imidazolium bis(trifluoromethane sulfonyl)imide), or poly((N-methyl-N-propylpiperidinium bis(trifluoromethane sulfonyl)imide)).

The ion-conductive polymer may include, for example, an ion conductive repeating unit which is derived from at least one of an ether-based monomer, an acryl-based monomer, a methacryl-based monomer, or a siloxane-based monomer.

The ion-conductive polymer may include, for example, at least one of polyethylene oxide (PEO), polyvinyl alcohol (PVA), polyvinyl pyrrolidone (PVP), polysulfone, polypropylene oxide (PPO), polymethyl methacrylate, polyethyl methacrylate, polydimethyl siloxane, polyacrylic acid, polymethacrylic acid, polymethyl acrylate, polyethyl acrylate, poly(2-ethylhexyl acrylate), polybutyl methacrylate, poly (2-ethylhexyl methacrylate), polydecyl acrylate, polyethylene vinylacetate, a phosphate ester polymer, polyester sulfide, polyvinylidene fluoride (PVdF), or Li-substituted Nafion. However, the disclosed embodiment is not limited thereto. Any suitable material for an ion-conductive polymer may be used.

The electron-conductive polymer may be, for example, at least one of a polyphenylene derivative, or a polythiophene derivative. However, the disclosed embodiment is not limited thereto. Any suitable electron-conductive polymer available in the art may be used.

For example, the gel electrolyte may be obtained by adding a low-molecular weight solvent to the solid electrolyte between the cathode and the anode. For example, the gel electrolyte may be obtained by adding a solvent, which is a low-molecular weight organic compound, or an oligomer into a polymer. For example, the gel electrolyte may be obtained by adding a solvent, which is a low-molecular weight organic compound, or an oligomer into the polymer electrolyte described above.

For example, the liquid electrolyte may include a solvent and a lithium salt.

The solvent may include at least one selected from an organic solvent, an ionic liquid, and an oligomer. However, the disclosed embodiment is not limited thereto. Any suitable solvent that is in liquid form at room temperature (25° C.) available in the art may be used.

The organic solvent may include, for example, at least one of an ether-based solvent, a carbonate-based solvent, an ester-based solvent, or a ketone-based solvent. For example, the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyl tetrahydrofuran, γ-butyrolactone, dioxorane, 4-methyldioxorane, dimethyl acetamide, dimethylsulfoxide, dioxane, 1,2-dimethoxyethane, sulforane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=about 500), dimethyl ether, diethyl ether, dibutyl ether, or dimethoxyethane. However, the disclosed embodiment is not limited thereto. Any suitable organic solvent in liquid form at room temperature may be used.

The ionic liquid (IL) may include, for example, a cation and an anion. The cation may be at least one of an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation. The anion may be at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2O)_2PO^-$.

The lithium salt may include, for example, at least one of LiTFSI ($LiN(SO_2CF_3)_2$), $LiPF_6$, $LiBF_4$, $LiAsF_6$, $LiClO_4$, $LiNO_3$, lithium bis(oxalato) borate (LiBOB), $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethanesulfonate ($LiCF_3SO_3$, LiTfO). However, the disclosed embodiment is not limited thereto. Any suitable lithium salt may be used. A concentration of the lithium salt may be, for example, in a range of about 0.01 molar (M) to about 5 M.

In an embodiment, the lithium air battery may further include, for example, a separator between the cathode and the anode. The separator may be any suitable separator having a composition durable under usage environments of a lithium air battery. For example, the separator may be at least one of a polymeric non-woven fabric such as a polypropylene non-woven fabric or a polyphenylene sulfide non-woven fabric; a porous film of an olefin-based resin such as polyethylene or polypropylene; or glass fiber.

For example, the electrolyte membrane may have a structure including a separator impregnated with a solid polymer electrolyte or a liquid electrolyte. The electrolyte membrane including a separator impregnated with a solid polymer electrolyte may be prepared by disposing a solid polymer electrolyte film on one or both surfaces of the separator while performing roll-pressing thereon at the same time. In an embodiment, the electrolyte membrane including a separator impregnated with a liquid electrolyte may be prepared by injecting the liquid electrolyte including a lithium salt into the separator.

According to still another aspect, a method of preparing a lithium air battery may include:

disposing an electrolyte film on an anode including lithium;

disposing a metal alloyable with lithium on the electrolyte film; and electrochemically forming a lithium alloy from the metal alloyable with lithium to form a cathode on the electrolyte film.

In an embodiment, the electrolyte film may be a solid electrolyte film.

In an embodiment, the cathode, the electrolyte film, and the anode may each be understood by referring to the descriptions for the cathode, the electrolyte, and the anode described above.

The electrochemical formation of the lithium alloy may include electrochemically doping the lithium on the metal alloyable with lithium. The method of electrochemically doping the metal with the lithium may not be particularly limited. Any suitable doping method may be used.

The lithium air battery according to an embodiment may be prepared by a method known to those of skill in the art without undue experimentation.

For example, after the anode is mounted on an inner side of a case, the electrolyte membrane may be disposed on the anode, the cathode may be disposed on the electrolyte membrane, a porous cathode current collector may be disposed on the cathode, and a pressing member that allows transfer of air into the air electrode and which pushes the porous cathode current collector to fix the cell, may be disposed on the cathode current collector, thereby completing the manufacture of the lithium air battery. The case may be divided into upper and lower parts that contact the anode and the air electrode, respectively. An insulating resin may be between the upper and lower parts to electrically insulate the cathode and the anode from each other.

The lithium air battery may be a lithium primary battery or a lithium secondary battery. The lithium air battery is not limited to a specific shape, and may have, for example, a shape like a coin, a button, a sheet, a stack, a cylinder, a plane, or a horn. The lithium air battery may be used as a large battery for an electric vehicle.

Figure 9:
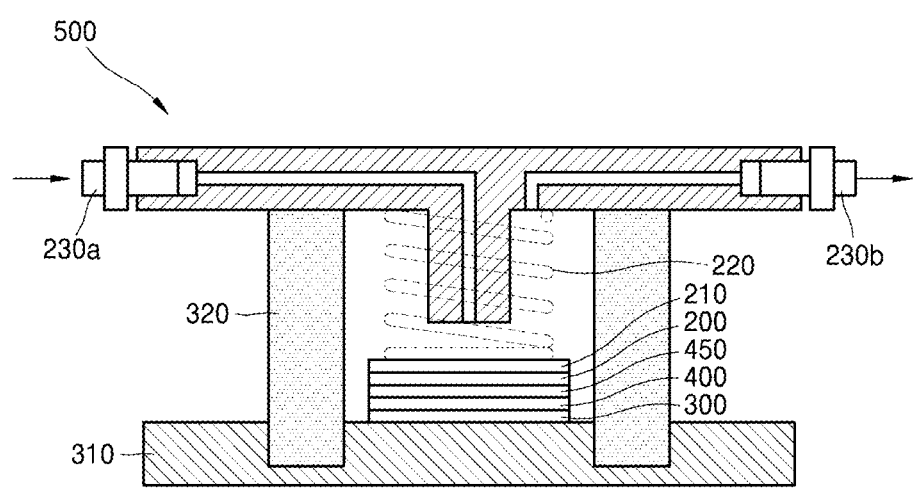
FIG. 9 is a schematic view illustrating an embodiment of a structure of a lithium air battery.

FIG. 9 is a schematic view illustrating an embodiment of a structure of a lithium air battery 500. Referring to FIG. 9, the lithium air battery 500 may include a cathode 200 adjacent to a first current collector 210 and using oxygen as an active material, an anode 300 adjacent to a second current collector 310 and including lithium, and a first electrolyte membrane 400 between the cathode 200 and the anode 300. The first electrolyte membrane 400 may be a separator impregnated with a liquid electrolyte. A second electrolyte membrane 450 may be between the cathode 200 and the first electrolyte membrane 400. The second electrolyte membrane 450 may be a lithium ion conductive solid electrolyte film. The first current collector 210, which is porous, may serve as a gas diffusion layer. Also, a pressing member 220 that allows air to reach the cathode 200 may be on the first current collector 210. A case 320 formed of an insulating resin between the cathode 200 and the anode 300 may electrically insulate the cathode 200 and the anode 300 from each other. Air may be supplied through an air inlet 230$a$ and be discharged through an air outlet 230$b$. The lithium air battery 500 may be accommodated in a stainless steel (SUS) container (not shown).

The term "air" as it relates to a lithium air battery, as used herein, is not limited to atmospheric air, and may refer to any suitable combination of gases including oxygen, or pure oxygen gas. This broad definition of "air" also applies to other terms including "air battery" and "air electrode".

Hereinafter example embodiments will be described in detail with reference to Examples and Comparative Examples. These examples are provided for illustrative purposes only and are not intended to limit the scope of the present inventive concept.

EXAMPLES

Preparation of Lithium Air Battery

Example 1: Preparation of Lithium Air Battery (Cathode/LATP/PEGDME/Li Anode)

A polymeric electrolyte was disposed as an intermediate layer on a lithium metal foil having a thickness of 260 μm (available from Ohara Corp., Japan) serving as an anode. The polymeric electrolyte was prepared by mixing polyethylene glycol dimethylether (PEGDME, Mn=500 Daltons) with a lithium salt, i.e., lithium bis(trifluoromethylsulfonyl) imide (LiTFSI), such that a molar ratio between PEGDME to Li was 20:1.

A solid electrolyte film, i.e., a lithium aluminum titanium phosphate (LATP) film having a thickness of 260 μm (available from Ohara Corp., Japan) was disposed on the polymeric electrolyte.

A layer of platinum (Pt) metal having a thickness of 8 nanometers (nm) was formed on the solid electrolyte film, and the Pt metal was doped with lithium at a current density of 0.4 microamperes per square centimeter (μA/cm$^2$), thereby forming a Li$_x$Pt$_y$ alloy cathode. The charge and discharge were performed at a current density in a range of 0.4 μA/cm$^2$ to 32 μA/cm$^2$.

Next, a nickel mesh was disposed on the cathode, and a pressing member that allows air to reach the cathode may apply pressure to fix the cell, was added, thereby completing the preparation of the lithium air battery.

Example 2

Figure 2:
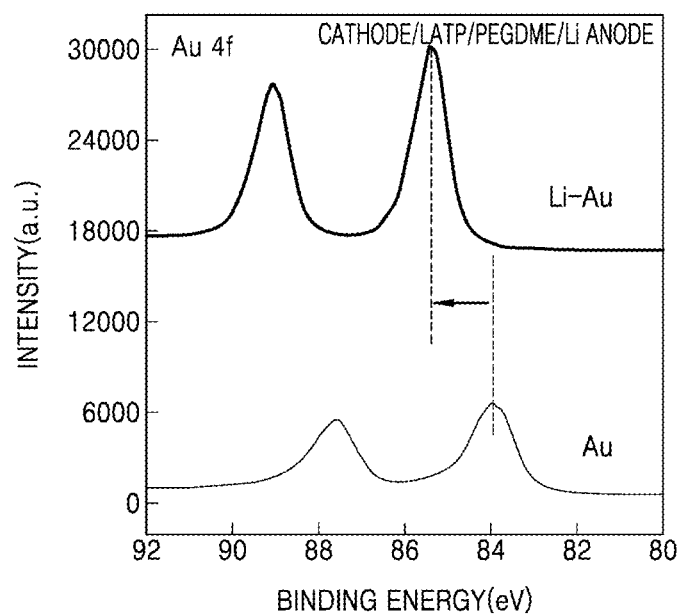
FIG. 2 is a graph of intensity (arbitrary unit, a.u.) versus binding energy (electron volts, eV), illustrating a work function measured by X-ray photoelectron spectroscopy (XPS) of a lithium air battery according to Example 2.

A lithium air battery was prepared in substantially the same manner as in Example 1, except that a layer of gold (Au) metal having a thickness of 8 nm was used instead of Pt metal having a thickness of 8 nm. Here, a binding energy of Au 4f electrons was measured by X-ray photoelectron spectroscopy (XPS) of the cathode/LATP/PEGDME/Li anode structure in the prepared lithium air battery, the results of which are shown in FIG. 2.

Figure 4A:
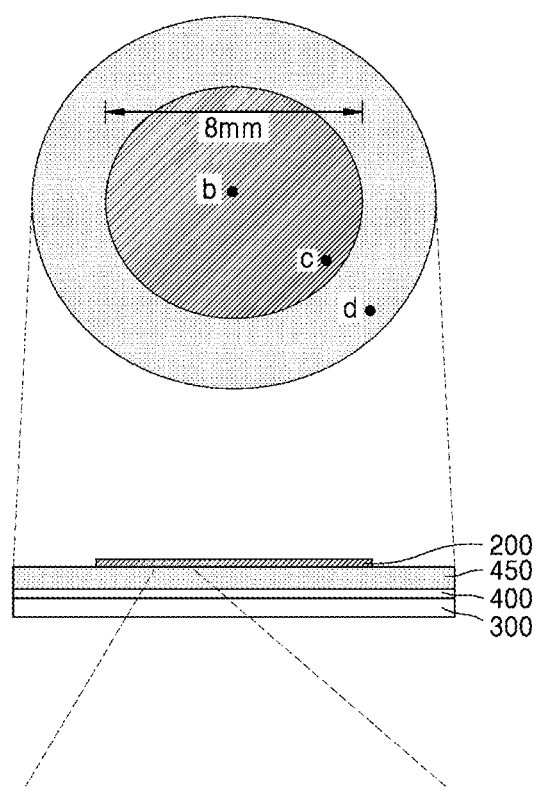
FIG. 4A is a schematic view of an embodiment of an electrode structure including a cathode, an anode, and a solid electrolyte and a discharge product formed on a surface of the cathode.
Figure 4B:
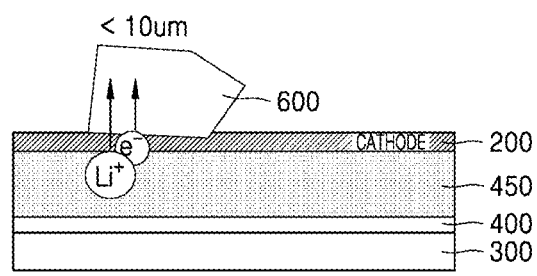
FIG. 4B is an expanded view of a portion of the electrode structure of FIG. 4A.
Figure 4C:
FIGS. 4C to 4F are scanning electron microscope (SEM) images corresponding to portions of region labelled "b" in the electrode structure shown in FIG. 4A.
Figure 4D:
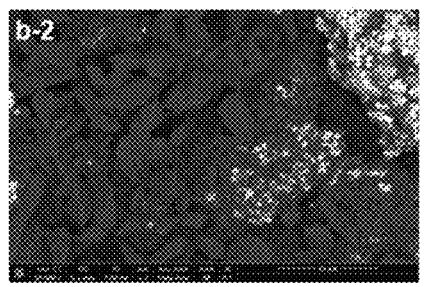
Figure 4E:
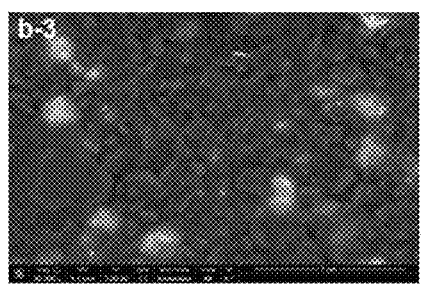
Figure 4F:
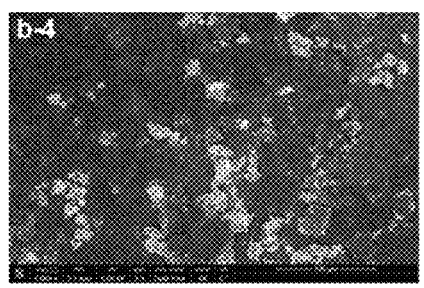

Further, a schematic view of the cathode/LATP/PEGDME/Li anode structure is shown in FIGS. 4A and 4B, and SEM images of each site are shown in FIGS. 4C to 4H.

Figure 4G:
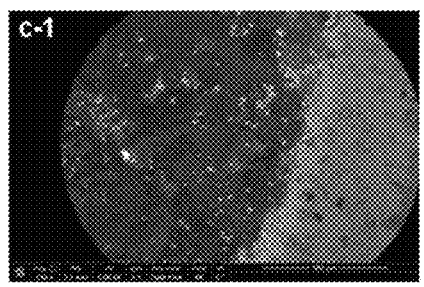
FIGS. 4G and 4H are scanning electron microscope (SEM) images corresponding to portions of the regions labelled "c" and "d" in the electrode structure shown in FIG. 4A.
Figure 4H:
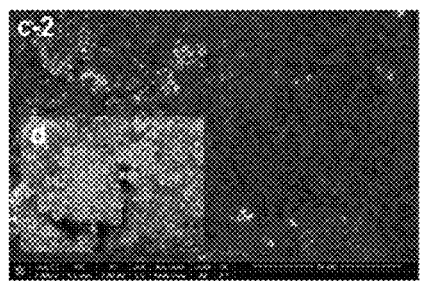
Figure 5A:
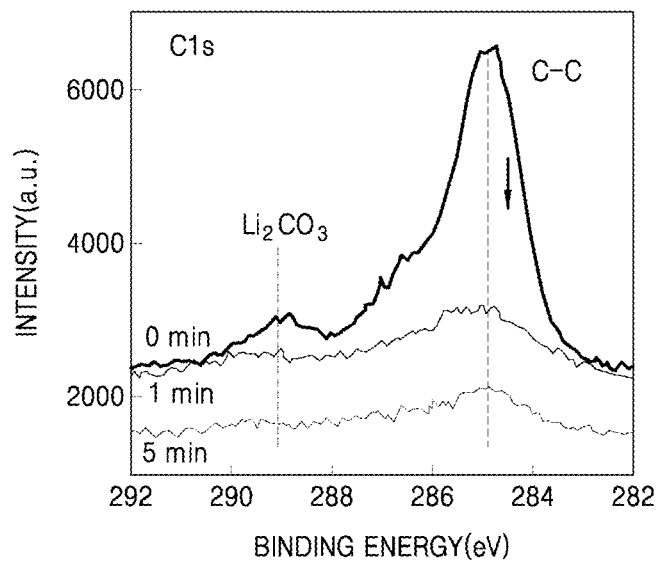
FIGS. 5A to 5C are each a graph of intensity (a.u.) versus binding energy (eV), illustrating the results of XPS of the discharge products formed on a surface of a cathode in the lithium air battery according to Example 2.
Figure 5B:
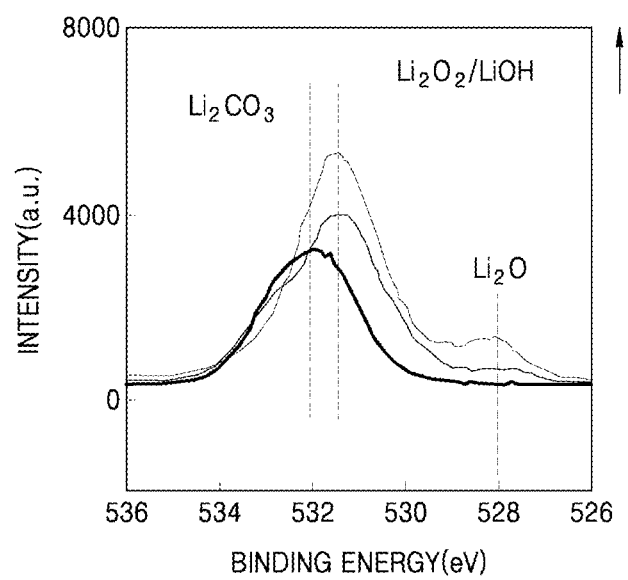
Figure 5C:
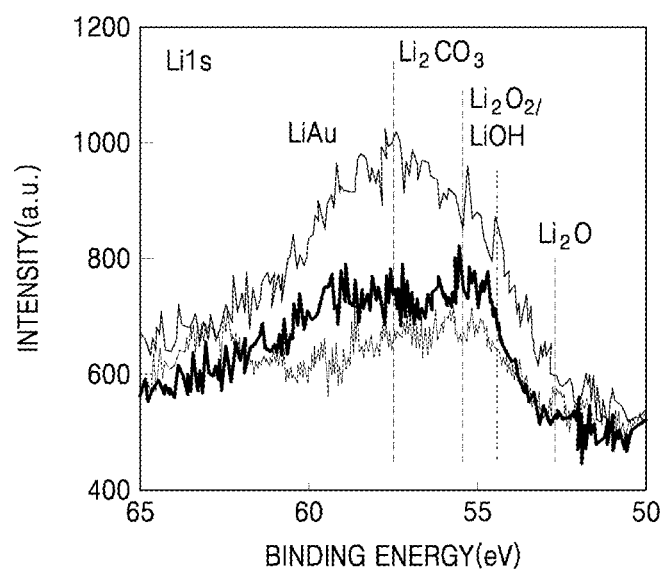
Figure 5D:
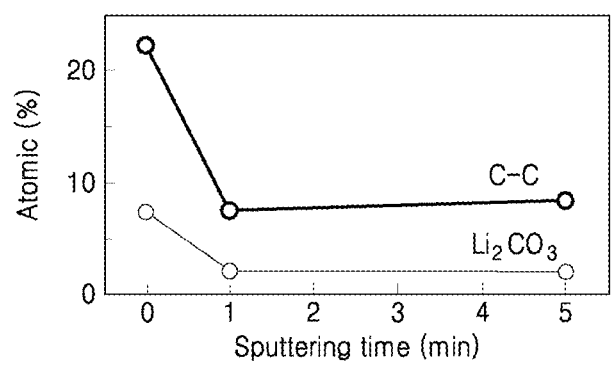
FIGS. 5D and 5E are each a graph of an atomic amount (percent, %) versus sputtering time (minutes, mins), illustrating a composition ratio of the discharge products over time.
Figure 5E:
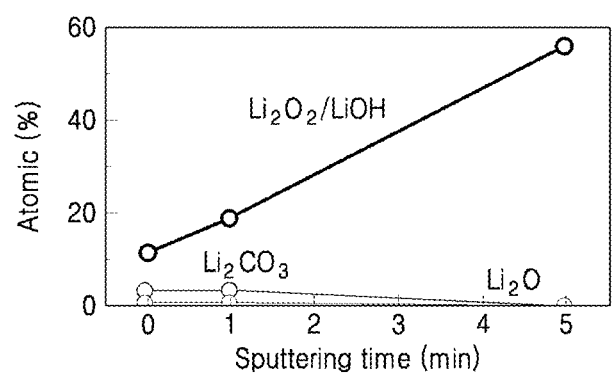

FIGS. 4C to 4F are scanning electron microscope (SEM) images corresponding to portions of region labelled "b" in the electrode structure shown in FIG. 4A and FIGS. 4G and 4H are scanning electron microscope (SEM) images corresponding to portions of the regions labelled "c" and "d" in the electrode structure shown in FIG. 4A. As shown in FIGS. 4A to 4H, a cathode 200 including the lithium alloy Li—Au alloy was formed, and a discharge product 600 was formed on a surface of the lithium alloy.

In particular, as shown in FIGS. 4C to 4H, a discharge product was formed only on the alloy, thereby showing maximum 10 µm of growth.

Example 3

A lithium air battery was prepared in substantially the same manner as in Example 1, except that a layer of silver (Ag) metal having a thickness of 8 nm was used instead of the Pt metal having a thickness of 8 nm.

Comparative Example 1

A lithium air battery was prepared in substantially the same manner as in Example 1, except that a layer of nickel (Ni) metal having a thickness of 8 nm was used instead of the Pt metal having a thickness of 8 nm.

Comparative Example 2

A lithium air battery was prepared in substantially the same manner as in Example 1, except that a layer of copper (Cu) metal having a thickness of 8 nm was used instead of the Pt metal having a thickness of 8 nm.

Evaluation Example 1: Evaluation of Electronic Conductivity

Both surfaces of the cathodes used in the lithium air batteries prepared in Examples 1 to 3 and Comparative Examples 1 and 2 were subjected to sputtering with gold to thereby form an ion blocking cell. The electronic conductivity thereof was measured by using a 4-point probe method.

A time-dependent current was measured, which was obtained while applying a constant voltage of 100 millivolts (mV) to the complete symmetric cell for 30 minutes. An electronic resistance of the cathode was calculated from the measured current, and an electronic conductivity was calculated from the electronic resistance. The results of measured electronic conductivity are shown in Table 1.

TABLE 1

|  | Cathode composition | Electronic conductivity [S/cm] |
| --- | --- | --- |
| Example 1 | Li_Pt_ | $5.2 \times 10^5$ |
| Example 2 | Li_Au_ | $1.4 \times 10^5$ |
| Example 3 | Li_Ag_ | $3.0 \times 10^3$ |
| Comparative Example 1 | Ni | $1.4 \times 10^5$ |
| Comparative Example 2 | Cu | $5.6 \times 10^6$ |

Evaluation Example 2: Evaluation of Discharge Capacity

Figure 3:
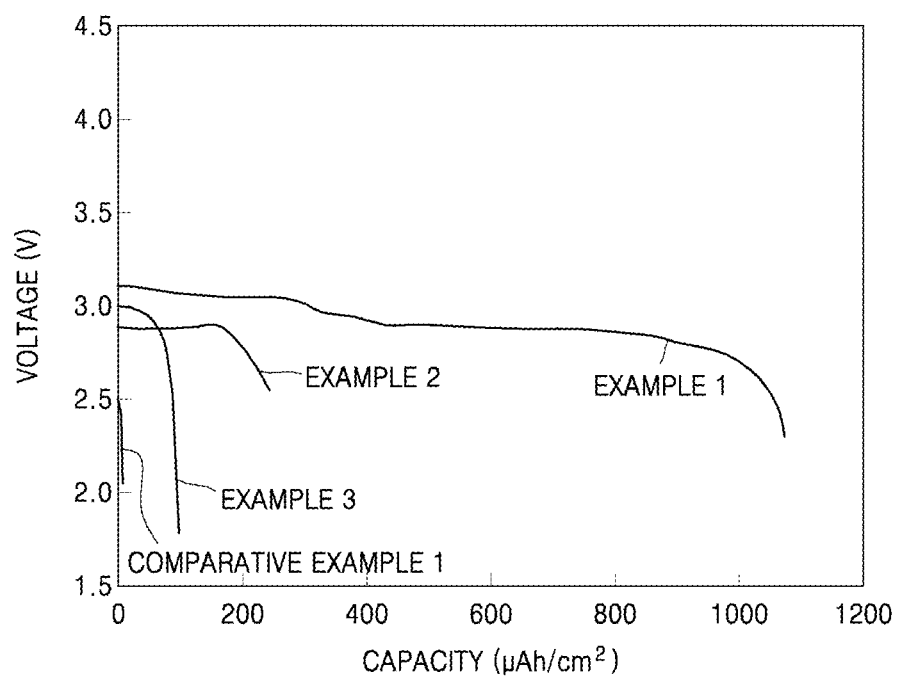
FIG. 3 is a graph of voltage (V) versus capacity (microampere-hours per square centimeter, $\mu Ah/cm^2$), illustrating discharge capacity relative to a weight of a cathode for the lithium air batteries according to Examples 1 to 3 and Comparative Example 1.

The lithium air batteries prepared in Examples 1 to 3 and Comparative Examples 1 and 2 were subjected to discharge to a voltage of 2.0 V (vs. Li) at a constant current of µA/cm² at a temperature of 60° C., at atmospheric pressure (1 atm), and under an oxygen atmosphere. The discharge capacity and the discharge capacity relative to the cathode were each measured, of which the results are shown in Table 2 and FIG. 3.

TABLE 2

|  | Discharge capacity (µAh/cm²) | Discharge capacity relative to the cathode (mAh/g$_{cathode}$) |
| --- | --- | --- |
| Example 1 | 1,071 | 89,400 |
| Example 2 | 243 | 28,200 |
| Example 3 | 98 | 47,700 |
| Comparative Example 1 | 0.1 | 8 |
| Comparative Example 2 | 0.1 | 8 |

Evaluation Example 3: Evaluation of Discharge Product

The discharge product formed on a surface of the cathode in the lithium air battery prepared in Example 2 was subjected to XPS spectrum and element composition measurement. The results thereof are shown in FIGS. 5A to 5E.

As shown FIGS. 5A to 5E, the discharge product may be lithium peroxide ($Li_2O_2$), lithium oxide ($Li_2O$), lithium hydroxide (LiOH), or lithium carbonate ($Li_2CO_3$). Also, a portion of the lithium alloy cathode was found to be included in the discharge product.

Evaluation Example 4: Evaluation of Charge/Discharge Characteristics

Figure 6:
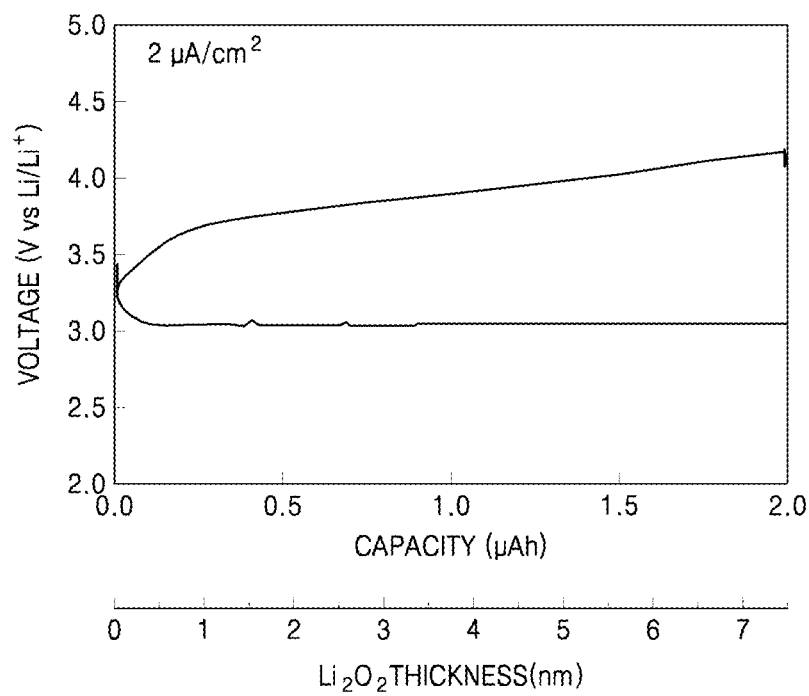
FIG. 6 is a graph of voltage (versus lithium, V vs Li/Li$^+$) versus capacity ($\mu Ah$) and $Li_2O_2$ thickness (nanometers, nm), showing a charge/discharge profile of the lithium air battery according to Example 1 and corresponding effect on $Li_2O_2$ thickness.
Figure 7:
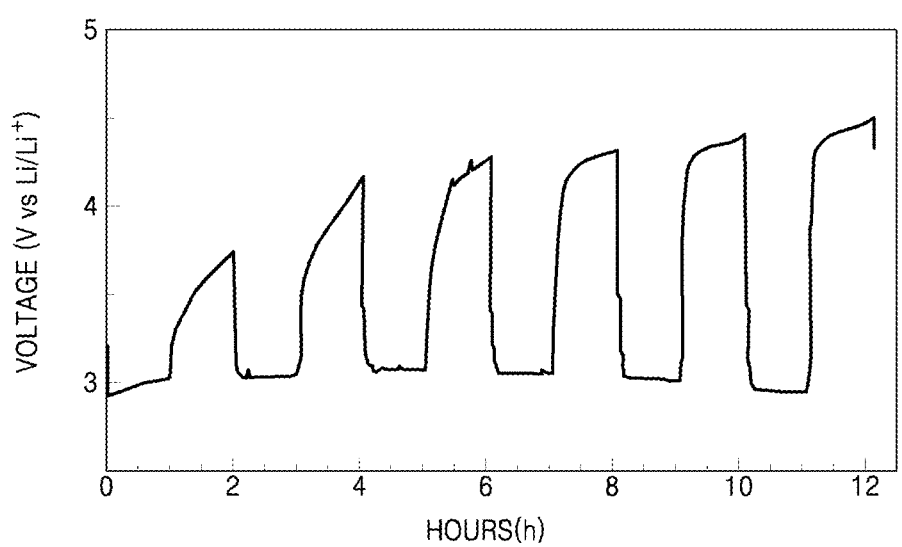
FIG. 7 is a charge/discharge profile of the lithium air battery according to Example 1 at current densities of 0.4, 2, 4, 8, 16, and 32 microamperes per square centimeter ($\mu A/cm^2$)

The lithium air battery prepared in Example 1 was discharged at a constant current of 0.4, 2, 4, 8, 16, or 32 µA/cm² for 1 hour at temperature of 60° C., at atmospheric pressure (1 atm), and under an oxygen atmosphere. Then, charging was performed with the same current for 1 hour to perform charge/discharge cycles, the results of which are shown in FIG. 7. FIG. 6 shows the charge/discharge test result in the first cycle.

As shown in FIGS. 6 and 7, the lithium air battery employing the cathode including the lithium alloy was found to have excellent charge/discharge characteristics.

Evaluation Example 5: Evaluation of Cycle Characteristics

The lithium air battery prepared in Example 1 was discharged at a constant current of 0.0013 mA/cm² for 1 hour at temperature of 60° C., at atmospheric pressure (1 atm), and under an oxygen atmosphere. Then, charging was performed with the same current for 1 hour to perform charge/discharge cycles. Here, cut-off voltage was in a range of 2.8 V to 4.2 V (vs. Li). This cycle was performed 400 times. The graph of charge/discharge is shown in FIG. 8.

Figure 8:
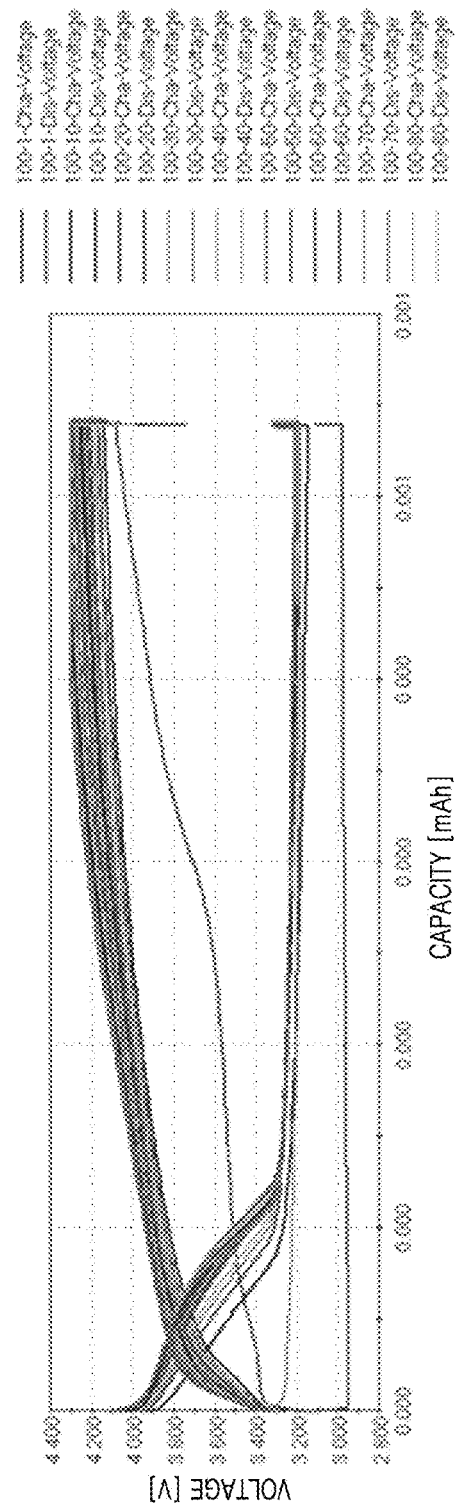
FIG. 8 is a graph of voltage (V) versus capacity (milliampere hours, mAh), showing the charge/discharge profile of the lithium air battery according to Example 1 during 200 cycles.

Referring to FIG. 8, the lithium air battery employing the cathode including the lithium alloy was found to have excellent cycle characteristics.

It should be understood that the disclosed embodiment described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A cathode configured to use oxygen as a cathode active material, the cathode comprising a lithium alloy layer.

2. The cathode of claim 1, wherein the lithium alloy layer is an electronic conductor and a lithium ion conductor.

3. The cathode of claim 1, wherein the lithium alloy layer is represented by Formula 1:

$$Li_xM_y \qquad \text{Formula 1}$$

wherein, in Formula 1, M is a metal alloyable with lithium, and $0<x\leq10$, $0<y\leq10$, and $0<x/y<10$.

4. The cathode of claim 3, wherein, in Formula 1, M is at least one of Pb, Sn, Mo, Hf, U, Nb, Th, Ta, Bi, Mg, Al, Si, Zn, Ag, Cd, In, Sb, Pt, or Au.

5. The cathode of claim 3, wherein, in Formula 1, $0<x/y<5$.

6. The cathode of claim 1, wherein the lithium alloy layer is at least one of $Li_{0.06}Pt$, $Li_{0.14}Pt$, $Li_{0.33}Pt$, LiPt, $Li_2Pt$, $LiPt_7$, $Li_{0.06}Au$, $Li_{0.14}Au$, $Li_{0.33}Au$, LiAu, $Li_2Au$, $LiAu_7$, $Li_{0.06}Ag$, $Li_{0.14}Ag$, $Li_{0.33}Ag$, LiAg, $Li_2Ag$, or $LiAg_7$.

7. The cathode of claim 1, wherein an electronic conductivity of the lithium alloy layer is about $1.0\times10^{-3}$ Siemens per centimeter (S/cm) or higher.

8. The cathode of claim 1, wherein a discharge capacity of the lithium alloy layer is about 1.0 microampere-hour per square centimeter ($\mu Ah/cm^2$) or greater.

9. The cathode of claim 1, wherein a discharge capacity of the lithium alloy layer relative to a weight of the cathode is about 100 milliampere-hours per gram of the cathode ($mAh/g_{\_cathode}$) or greater.

10. The cathode of claim 1, wherein the lithium alloy layer is electrochemically stable at a voltage of about 2.5 volts (V) or greater versus (vs.) lithium metal.

11. The cathode of claim 1, further comprising a metal that is a precursor of the lithium alloy layer.

12. The cathode of claim 1, wherein the cathode is porous.

13. A lithium air battery comprising:
the cathode of claim 1;
an anode comprising lithium; and
an electrolyte between the cathode and the anode.

14. The lithium air battery of claim 13, wherein the lithium air battery further comprises a discharge product disposed on a surface of the cathode, wherein the discharge product comprises at least one of lithium peroxide, lithium oxide, lithium hydroxide, or lithium carbonate.

15. The lithium air battery of claim 14, wherein a thickness of the discharge product is about 10 micrometers ($\mu m$) or less.

16. The lithium air battery of claim 14, wherein the discharge product is at least one of $Li_2O_2$, LiOH, $Li_2CO_3$, or $Li_2O$.

17. The lithium air battery of claim 13, wherein the electrolyte comprises a solid electrolyte.

18. The lithium air battery of claim 17, wherein the solid electrolyte is at least one of a lithium ion-conductive glass, a crystalline lithium ion-conductive ceramic, or a crystalline lithium ion-conductive glass-ceramic.

19. The lithium air battery of claim 17, wherein the solid electrolyte comprises at least one of lithium-aluminum-germanium-phosphate (LAGP), lithium-aluminum-titanium-phosphate (LATP), or lithium-aluminum-titanium-silicon-phosphate (LATSP).

20. A method of preparing the lithium air battery of claim 13, the method comprising:
disposing an electrolyte film on the anode;
disposing a metal alloyable with lithium on the electrolyte film; and
electrochemically forming a lithium alloy layer from the metal alloyable with lithium to form the cathode on the electrolyte film to prepare the lithium air battery.

21. The method of claim 20, wherein the electrolyte film is a solid electrolyte film.

* * * * *